US008649801B2

(12) United States Patent
Tietsch et al.

(10) Patent No.: US 8,649,801 B2
(45) Date of Patent: Feb. 11, 2014

(54) METHOD FOR A SUBSCRIBER UNIT'S COMMUNICATION WITH A SERVICE AND A COMPONENT IN A NETWORK

(75) Inventors: Michael Tietsch, Kaufering (DE); Karl Klaghofer, München (DE); Holger Prange, München (DE); Thomas Scharnagl, Perchtoldsdorf (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 174 days.

(21) Appl. No.: 13/147,677

(22) PCT Filed: Oct. 11, 2010

(86) PCT No.: PCT/EP2010/006200
§ 371 (c)(1),
(2), (4) Date: Aug. 3, 2011

(87) PCT Pub. No.: WO2012/048716
PCT Pub. Date: Apr. 19, 2012

(65) Prior Publication Data
US 2012/0184291 A1 Jul. 19, 2012

(51) Int. Cl.
*H04W 64/00* (2009.01)
(52) U.S. Cl.
USPC .............. 455/456.1; 340/462.19; 340/539.13; 455/404.2
(58) Field of Classification Search
USPC .......... 455/456.1, 404.2, 414.1, 412.1, 412.2, 455/466; 340/539.13, 539.32, 8.1, 426.19, 340/426.22
See application file for complete search history.

(56) References Cited

U.S. PATENT DOCUMENTS

| | | | | |
|---|---|---|---|---|
| 7,890,582 | B2* | 2/2011 | Im et al. ...................... | 709/204 |
| 8,068,856 | B2* | 11/2011 | Kwon ....................... | 455/456.3 |
| 2004/0198397 | A1* | 10/2004 | Weiss ....................... | 455/456.5 |
| 2006/0246922 | A1* | 11/2006 | Gasbarro et al. ........... | 455/456.6 |
| 2007/0099634 | A1 | 5/2007 | Chari et al. | |
| 2007/0286160 | A1 | 12/2007 | Gorti et al. | |
| 2007/0298813 | A1 | 12/2007 | Singh et al. | |
| 2010/0029272 | A1* | 2/2010 | McCann et al. ............. | 455/433 |
| 2010/0041415 | A1* | 2/2010 | Ishioka et al. ............. | 455/456.1 |
| 2010/0075628 | A1* | 3/2010 | Ye .............................. | 455/404.2 |
| 2010/0151864 | A1* | 6/2010 | Mori .......................... | 455/436 |
| 2011/0051658 | A1* | 3/2011 | Jin et al. ...................... | 370/328 |
| 2012/0003990 | A1* | 1/2012 | Lee ............................. | 455/456.1 |

OTHER PUBLICATIONS

International Search Report for PCT/EP2010/006200 dated Jan. 26, 2011 (Form PCT/ISA/210) (German Translation).
Written Opinion of the International Searching Authority for PCT/EP2010/006200 dated Jan. 26, 2011 (Form PCT/ISA/237) (German Translation).
International Preliminary Report on Patentability for PCT/EP2010/00620 dated Apr. 16, 2013 (German).
International Preliminary Report on Patentability for PCT/EP2010/00620 dated Apr. 16, 2013 (English Translation).

* cited by examiner

*Primary Examiner* — Cong Tran
(74) *Attorney, Agent, or Firm* — Buchanan Ingersoll & Rooney PC

(57) ABSTRACT

Using a method for a subscriber unit's communication with a service that requires information about the subscriber unit's location, the subscriber unit sends the service a message containing information about the subscriber unit's location and at least one piece of information about the subscriber unit's location is stored in at least one network component and is made available by a network component.

15 Claims, 3 Drawing Sheets

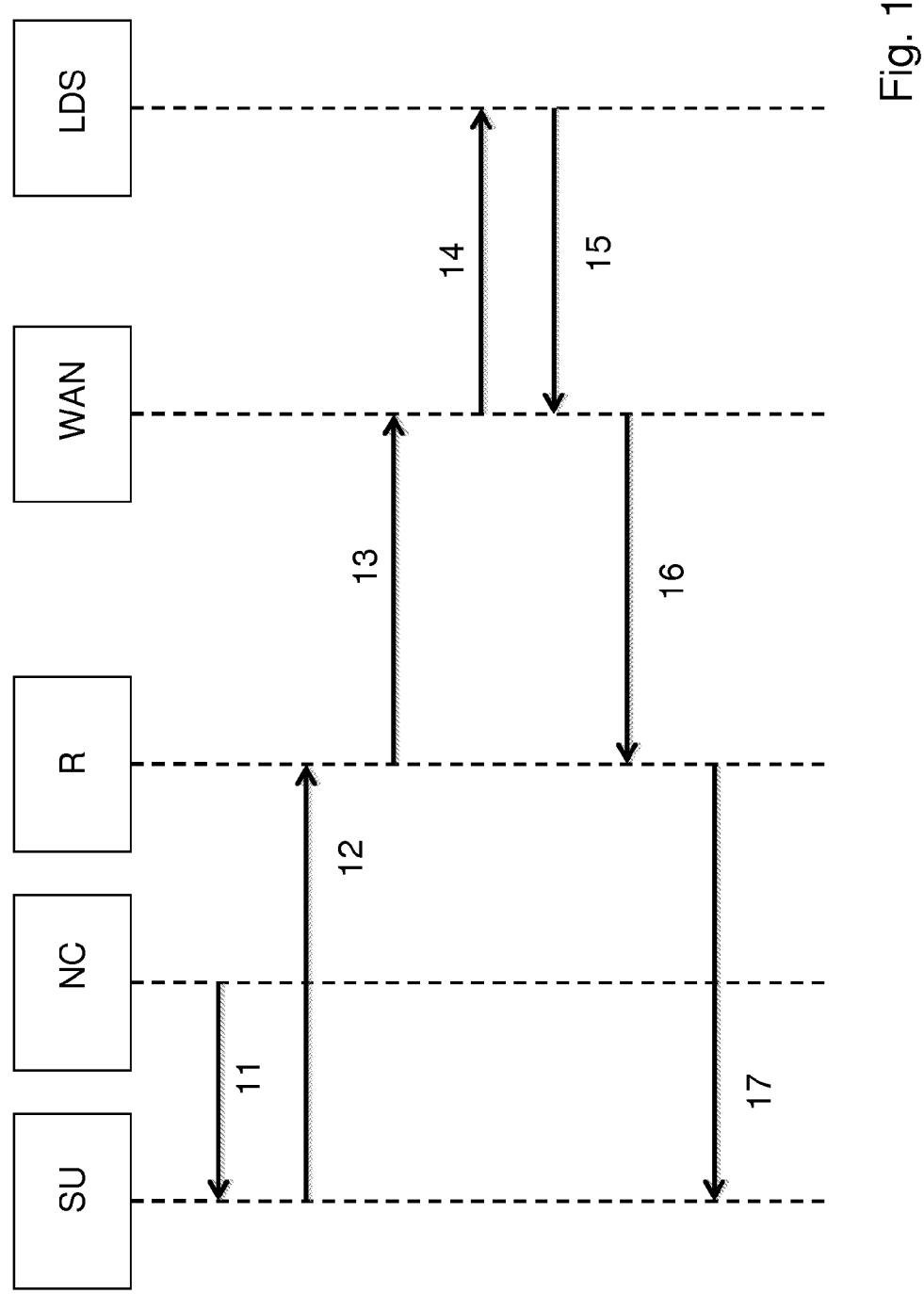

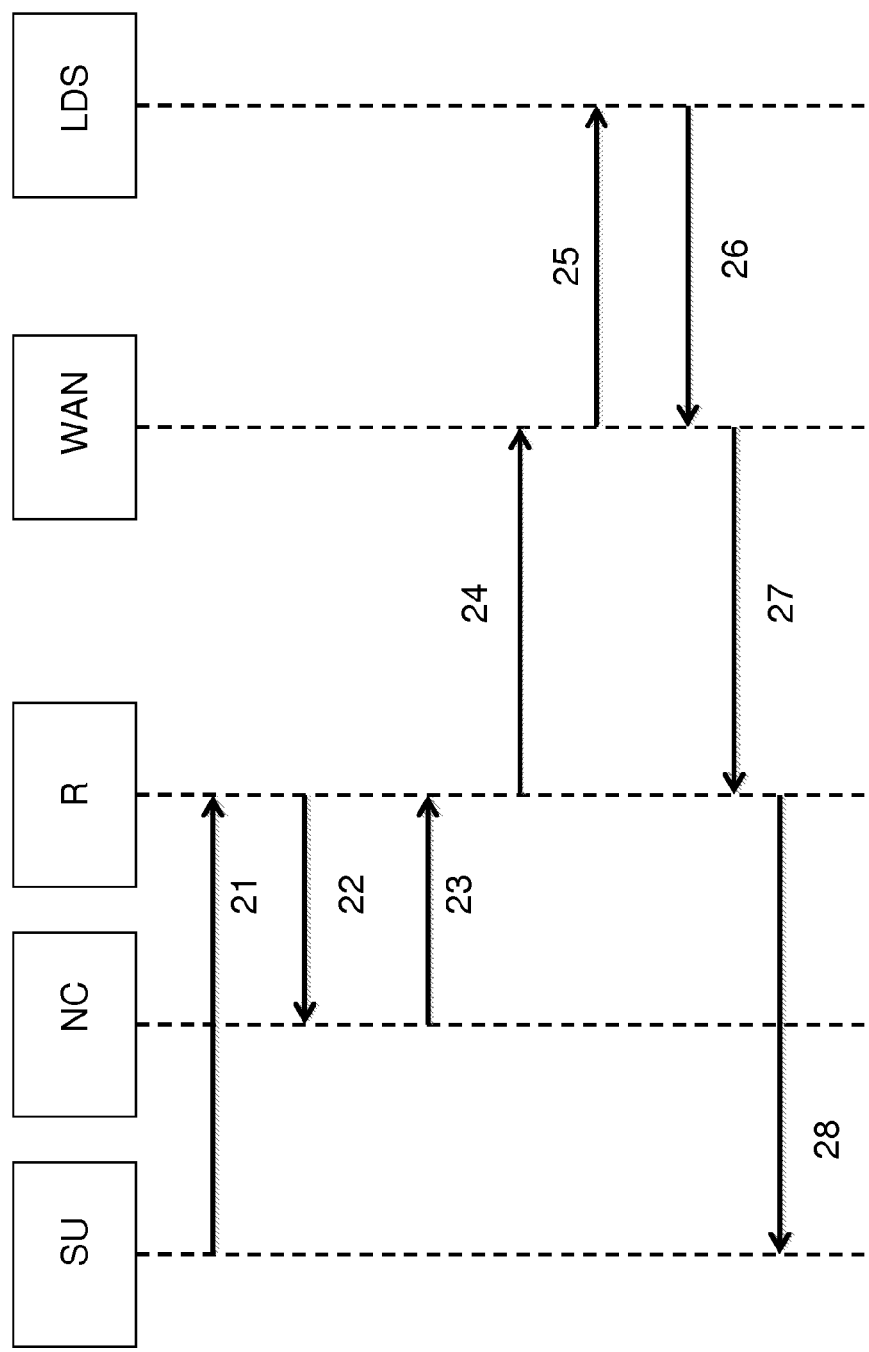

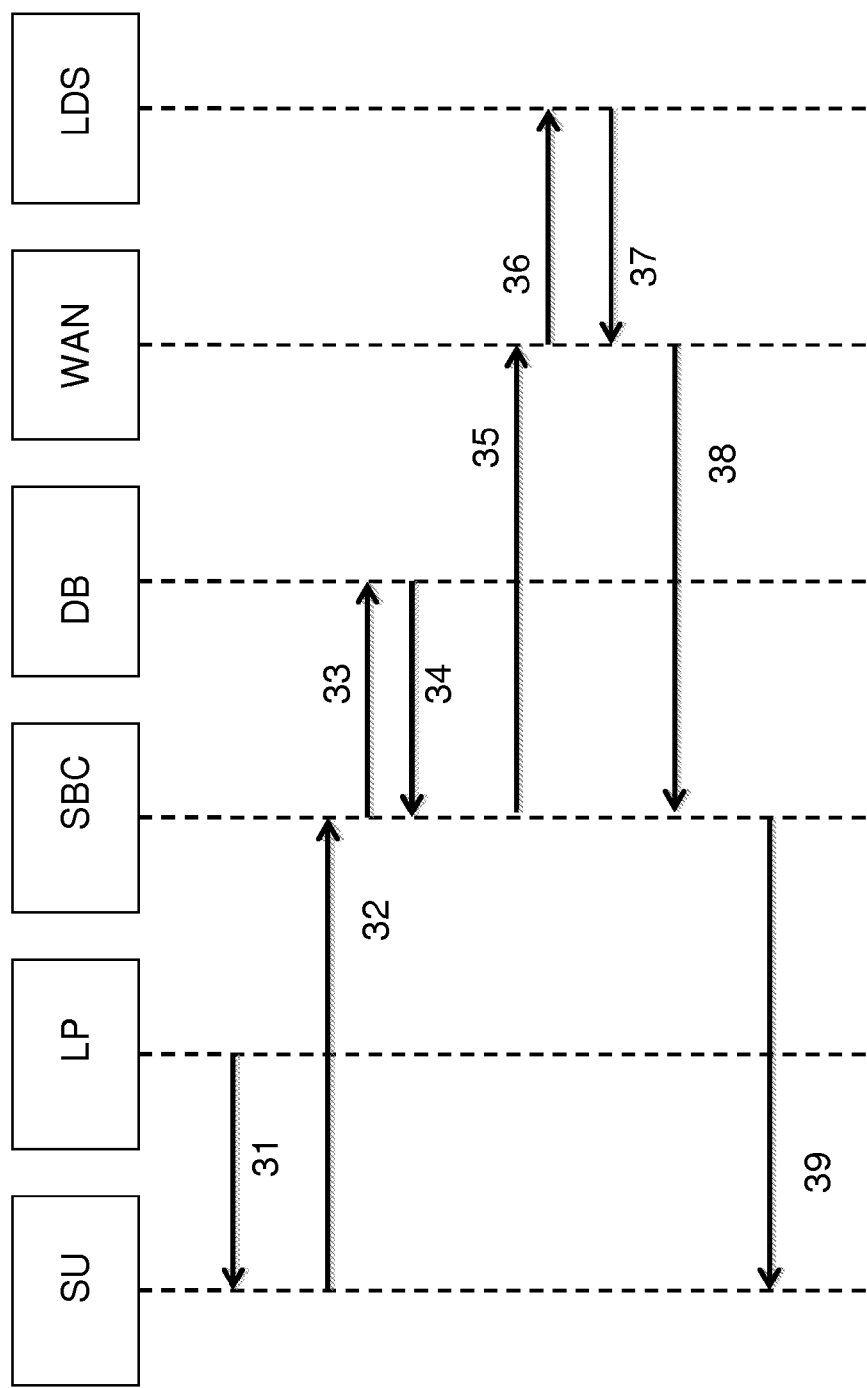

METHOD FOR A SUBSCRIBER UNIT'S COMMUNICATION WITH A SERVICE AND A COMPONENT IN A NETWORK

CROSS-REFERENCE TO RELATED APPLICATIONS

This application is the United States national phase under 35 U.S.C. §371 of PCT International Patent Application No. PCT/EP2010/006200, filed on Oct. 11, 2010.

BACKGROUND OF THE INVENTION

1. Field of the Invention

Embodiments relate to a method for a subscriber unit's communication with a service that requires information about the subscriber unit's location. Such services are also referred to as Location Based Services (LBS) or as Location Dependent Services (LDS).

2. Background of the Related Art

As part of such services and with the aid of position-related data, an end user is provided with information that relates to the location of the subscriber unit or is furnished with services, the type or content of which depends on the location of the end user, or the furnishing of which requires knowledge of the end user's location. Often, these are services in the context of mobile communication systems, where the end user uses a mobile communication terminal, for example a mobile telephone, such that the location of the end user cannot be known to the service provider at the outset, for which reason data about the position of the end user or about the position of his terminal need to be communicated to the service provider.

In this description, end user refers to a user of a subscriber terminal unit. For the sake of linguistic simplification, the location of the end user's subscriber terminal unit shall hereinafter be referred to in brief as the end user's location, although this will mean the location of the subscriber terminal unit unless expressly stated otherwise.

Location-based services can also be offered in connection with stationary terminal units, for example in telephone networks, which can include both conventional connection-oriented telephone networks and packet-switched networks, in particular Internet protocol-based telephone networks. In conventional so-called landline networks, the end user's location can often be determined from his telephone number, because in such networks the telephone numbers are often assigned according to a geographic numbering system.

In this case, telephone numbers are often assigned in a location-based manner because the hardware structure of these networks is oriented on the geographic distribution of the subscriber units, such that in these cases the first few digits of a telephone number indicate the location based on the underlying telephone number system. Examples include area codes, which allow an inference as to the region where the end user is located. However, the invention is not restricted to such telephone number systems.

The increasing importance of Internet-based devices and communication systems is creating a growing need for determining the location of a terminal communication unit in a manner other than from its telephone number, because such devices often do not use telephone numbers that permit a conclusion about the location of the terminal unit and also do not transmit any other information that would allow an inference about the unit's location.

BRIEF SUMMARY OF THE INVENTION

We provide a technical teaching with which location-based services can be used even by the types of terminal units and networks that do not allow for the use or transmission of location-based information from the terminal unit. Examples of such terminal units are Internet phones, notebooks, desktop computers or other information technology equipment suitable for communication, which often are assigned only one address within a local network, preferably an Internet address, which does not allow any conclusions about the location of the device.

According to one embodiment of the invention, a method is provided for a subscriber unit's communication with a service that requires the subscriber unit's location information, wherein the subscriber unit sends the service a message containing information about the subscriber unit's location, and where at least one piece of information about the subscriber unit's location is stored in at least one network component and is made available by one network component.

In this context, a subscriber unit refers to any type of device that a communication subscriber uses for communication. Important examples of subscriber units are communication terminal units such as telephones or information technology devices such as personal computers or similar devices.

In this context, a message that is transmitted by a subscriber unit to a service and contains information about the location of the subscriber unit refers to any message that at the time it is received by the service contains information about the location of the subscriber, regardless of the time or point in the transmission path of the message at which this information about the subscriber unit's location was inserted.

In this context, a network component refers to any device in a network suitable for communication that is equipped to store information about a subscriber unit's location and make said information available for communication.

BRIEF DESCRIPTION OF THE FIGURES

The figures show:

FIG. 1—a schematic representation of the message flow in a first embodiment of the invention;

FIG. 2—a schematic representation of the message flow in a second embodiment of the invention;

FIG. 3—a schematic representation of the message flow in a third embodiment of the invention.

DETAILED DESCRIPTION OF THE INVENTION

One preferred embodiment of the present invention is a method, wherein at least one piece of information about the subscriber unit's location is obtained by the subscriber unit from a network component, is stored in the subscriber unit and, when a message is sent to the service, is inserted by the subscriber unit into the message. The process of obtaining the information about the subscriber unit's location is preferably carried out when logging the subscriber unit onto the network that the subscriber unit uses for communication.

The network component from which the subscriber unit's location information has been obtained has been provided with the subscriber unit's location information, preferably by an administrator. Preferably, this information has been stored in the network component in advance by the administrator. When the subscriber unit logs onto the network, the subscriber unit's location information preferably is transferred from the memory of the network component, where the subscriber unit's location information was stored by the administrator, to the subscriber unit, is stored therein and is inserted by the subscriber unit into the message when transmitting a message.

In other preferred exemplary embodiments of the invention, which can also be combined preferably with previously described or with other exemplary embodiments of the invention, a method is provided with which at least one piece of information about the subscriber unit's location is inserted into the message by a component of the network when sending a message to the service. In these embodiments of the invention, the information about the subscriber unit's location is preferably not stored in the subscriber unit but rather inserted later into the message by the network component. Preferably, this is done by adding the subscriber unit's location information to a message after that message is transmitted initially by the subscriber unit without the subscriber unit's location information.

Preferably, this can occur in a network component that is used to forward the message to the service and that detects the fact that information about the subscriber unit's location is missing and preferably inserts this information into the message or, so that the information can be inserted, forwards the message to the network component that inserts the information about the subscriber unit's location.

Preferably, at least one piece of information about a subscriber unit's location stored in a network component is independent of a network address of the subscriber unit. This is especially associated with the advantage that the network administrator or another authority can assign network addresses independent of the subscriber unit's location. In these embodiments, changes to the network configuration do not require or affect any verification of or change to the information about the subscriber unit's location.

Some preferred embodiments of the invention provide that at least one piece of information about the subscriber unit's location stored in a network component is identical for multiple spatially adjacent subscriber units. These embodiments are associated with the advantage that, in cases where greater accuracy of the information about the subscriber unit's location is not required by a location-based service, the location of the subscriber unit can be provided less precisely. For example, instead of the room in a building, only the building number may be provided.

In some of the preferred embodiments of the invention, at least one provided piece of information about the subscriber unit's location is provided in a format that is adapted to the recipient of the message or to the service offered by this recipient. Preferably, the provided format is converted depending on the addressed service. For example, a building and/or room number can be converted into geographic coordinates for the location if the service used by the subscriber in operating the subscriber unit prefers or requires that the location information be provided in this format. Preferably, the preferred format is known to the network component providing this information or is disclosed to this component by the service, preferably requested by the component in a dialog with the service and the component. The invention is in no way limited to a specific format.

In some preferred embodiments of the invention, at least one piece of information stored in a network component about the subscriber unit's location is displayed or announced at least sometimes on the subscriber unit. For this purpose, the subscriber unit is preferably equipped with a display device or an acoustic output device, and the network component in which the information about the subscriber unit's location is stored transfers this information at times or on certain occasions to the subscriber unit and in doing so causes the information about the subscriber unit's location to be displayed or announced on the subscriber unit. This has the advantage that the subscriber who is going to use this subscriber unit for communication is able to check the correctness of the location information easily.

Preferably, this display or announcement is carried out in such a manner that one subscriber, after the display or announcement of the at least one piece of information about the subscriber unit's location stored in a network component, receives the option to confirm the correctness of the information, to repeat the display or announcement or to identify it as incorrect through a respective input at the subscriber unit. Preferably, the subscriber unit is equipped for this purpose with a respective input device with which the correctness of the information can be confirmed, its display or announcement can be repeated or it can be identified as incorrect.

In some preferred embodiments of the invention, a subscriber unit is at least sometimes locked with respect to at least one service that requires information about the subscriber unit's location, if after a display or announcement of the at least one piece of information about the subscriber unit's location, which is stored in a component of the network, a subscriber has marked this information as incorrect through a respective input at the subscriber unit.

In some preferred embodiments of the invention, at least one piece of information about the subscriber unit's location stored in a network component is displayed or announced at the subscriber unit after a network component has registered a change of the network structure. Preferably this occurs when a network structure has been changed by adding, removing or replacing components or if the address assignment or other parameters of the network have been altered, which could or will affect communication in the network.

The invention is described below in more detail based on preferred exemplary embodiments and with reference to the figures.

The invention offers an option for utilizing location-based services with communication devices that are not yet equipped with the ability to determine their own location and/or to forward this information about their own location in a message to a location-based service. However, location-based services assume that the location of a communication device, such as a telephone, for example, is known. Auxiliary constructs that use, for example, the IP address as an indicator for the location of a communication device involve difficulties, for example due to address translation (network address translation, NAT) or due to dynamic address assignment by so-called DHCP (dynamic host configuration protocol) servers.

Location-based assignment of IP addresses (Internet protocol addresses) or of so-called fully qualified domain names (FQDNs) and their provisional location-based interpretation are associated with various problems and cause an often considerable additional network administration effort. Such difficulties can be avoided through suitable embodiments of the present invention. In one preferred embodiment of the invention, a so-called network access control (NAC) switch (also: network admission control), i.e., a device in a network that controls the access to this network, for example, ensures that network devices normally log onto a company network or local network at a certain switch or port.

Network admission control (NAC) is a technology that controls network access of all devices that are or can be connected to the network. For example, in networks NAC components frequently check the authorization of a subscriber unit to connect to a specific port of this network. For this purpose, NAC components with this functionality preferably have information about the location of the port where this subscriber unit is to be connected.

Routers are network devices often operating at OSI layer 3 that connect or disconnect multiple computer networks as applicable. The router analyzes the arriving data packets according to their target address and either blocks or forwards them. "Routed" packets, i.e., packets forwarded by a router, either arrive in this manner at a target network that is connected directly to the router or are forwarded to another router that can be reached via the network.

Some exemplary embodiments of the invention preferably use functionally advanced routers that can operate at OSI Layer 5. In particular, according to the invention such functionally advanced routers should be able to analyze messages to see if they are addressed to a location-based service. However, the invention is not restricted to exemplary embodiments that assume the use of such functionally advanced routers.

In a first group of preferred embodiments of the invention that do not assume the use of such functionally advanced routers, information about the subscriber unit's location is always inserted in every message. This at least ensures that this information about the subscriber unit's location is included in every message, in particular in messages that are to be transmitted to a location-based service. Should this approach appear unfavorable with regard to a network operator's privacy policies, the invention provides preferred embodiments wherein information about the subscriber unit's location is subsequently filtered out of such messages that are not addressed to a location-based service using components provided for this purpose, for example so-called "OSV Switches". These embodiments are associated with the advantage that knowledge about the need for and/or contents of location-based information need only be provided or be available in components that are involved in call processing decisions. The network load is thus kept low, and private or confidential information is protected.

In a second group of preferred embodiments of the invention, which do not assume the use of such functionally advanced routers, it is intended to provide a profile or multiple profiles, which are preferably administered centrally, in which the destination numbers of location-based services such as emergency numbers for police, fire department, or similar services are stored. Preferably, additional profiles can be provided for each subscriber, in which the subscriber can store additional numbers decentrally (for example, telephone numbers of service provider companies such as pizza delivery services), to which information about the subscriber unit's location should be transferred.

These embodiments of the invention offer the advantage that the effort for central administration of such profiles could be limited to the required level, and that, moreover, private settings could be made easily, preferably also as a function of time or other parameters. These embodiments of the invention also have options for preferred variations, where preferably decisions are made automatically regarding whether and for which destination number information about the subscriber unit's location is attached, based on location and/or time and preferably using programmed suitable authorities provided for this purpose.

A switch is a connection element, preferably operating at OSI Layer 2, that connects network segments to each other. The term refers to a network device that forwards data to the data link layer (layer 2) of the OSI model.

Thus, the NAC switch has knowledge of all devices registered in the network, whereby regularly, i.e., as a rule, the switch port, the IP address and the device type of the devices registered in the network are known to said NAC switch.

For implementing the present invention, a NAC component may also be expanded by a function operating at Layer 5, where said function preferably analyzes data traffic on the basis of the so-called session initiation protocol (SIP) in a manner similar to that of a so-called session border control (SBC), for example.

Layer 5 (session layer, control of logic connections, also referred to as communication control layer) ensures process communication between two systems. The OSI layer model (also open systems interconnection [OSI] reference model) refers to a layer model of the International Organization for Standardization (ISO), which has been developed as a design basis for communication protocols in computer networks. The communication tasks have been divided into seven successive layers. Each layer has a description listing the tasks it is to accomplish. These requirements must be implemented by the communication protocols. The concrete implementation is not specified and can, therefore, be very different. Thus, by now numerous such protocols exist for each of the seven layers.

A session border controller (SBC) is a device used in particular in IP-based telephone networks such as voice-over-IP networks. The Session Initiation Protocol (SIP) also is often used in these networks. It is standardized in RFC3261 and other RFCs.

If a telephone transmits a SIP request, i.e., a request to a service using the session initiation protocol, and if this service is a location-dependent service, for example an emergency telephone number or another location-dependent service, then this layer 5 SIP function would become active and integrate the respective location information into the outgoing SIP requests, such that they are provided with the location-specific information in the direction of the SIP server, even if the transmitting subscriber units do not feature the capability of adding any location information to the messages they transmit.

Such a procedure is advantageous, for example, in connection with telephone devices that do not store location-specific information and therefore cannot insert location-specific information into outgoing messages. This makes it possible to carry out true communication with location-dependent services, independent of IP addresses or FQDNs. Using the present invention, entire telecommunication systems with such terminal units could be set up to address location-dependent services even without modifying the software of the terminal telephone units. For this purpose, already existing network components such as a NAC switch, for example, could preferably be expanded or supplemented appropriately, or replaced by new NAC switches, depending on which measure involves less effort.

Preferably, the location information can be a text element preconfigured in the network component, i.e., in the NAC switch for example, or a so-called PIDF-LO object or another format in which location-specific information could be stored.

Thus, in some embodiments the invention provides for a modification of the data traffic, for example data traffic based on the SIP protocol, for which session border controllers (SBCs), for example, are well suited. Thus, the invention is preferably implemented by expanding NAC switches with location-specific SBC components.

In case of protected connections, which are protected, for example, according to the transport layer security (TLS) protocol according to RFC5246 and other RFCs, other embodiments of the invention are preferred wherein the NAC switch is not required to modify a SIP message within the SIP signaling path. In these cases, it is preferred that the NAC switch operates as a service for other network elements interested in location information, for example, the SIP switch, and supplies these network elements with the location information. Thus, in the case of a TLS-encrypted message, the SIP switch makes a request to the network component that is provided with location information, for example the NAC switch, and requests the stored location information from the NAC switch and can then integrate this information within the SIP switch into the signaling information. One advantage of the invention can be seen in that the location-based information is obtained directly from the network infrastructure and registration information of the switched-in telephones or subscriber units, such that a misconfiguration can be avoided to a great extent.

A central network component, preferably a NAC switch, assumes the role of assigning the location information to a specific subscriber unit in the network, for example to a telephone. Even devices that do not have any location information stored in the device or any option for determining the location information by other means are thus enabled to address location-dependent services.

Today, the legislators of many countries stipulate that emergency calls to an emergency call center must by law be transmitted with a subscriber telephone number for the transmitting terminal unit that allows for a call back to the subscriber who transmitted the emergency call. Other so-called location-based services also require location-specific information for processing.

In traditional, i.e., analog or TDM-based infrastructures, this poses few problems, because location and telephone number can be correlated clearly. In these types of infrastructures, the location of the telephone remains the same at all times.

However, in modern, preferably IP-based telephones, the location of the telephone is not always the same. It can be selected almost arbitrarily within a corporate network. This also applies to so-called soft clients, i.e., telephone applications on a notebook used as a phone. Possible known solutions for determining the location of a telephone are:
1. Determination of the IP address of the calling subscriber unit and correlation with a location.
2. Determination of the FQDN from the SIP message of the calling subscriber and correlation with a location.

These two methods have the disadvantage that a data element is implicitly associated with a piece of location information. Such implicit methods are associated with complex planning, administration and corresponding susceptibility to errors.
3. The telephone is assigned a phone number with geographic significance, which is routed to the emergency call center and can be used for callback. However, this method requires a unique "geographic number" for each user, which is often expensive and difficult to administer. This geographic telephone number is also referred to as a location identification number (LIN). It can also differ from the subscriber's correct telephone number, for example in a so-called unified communication environment where only so-called global numbers are used.
4. The phone knows or determines its location and sends it along with the emergency SIP message, for example in the so-called PIDF-LO format. In an emergency, however, this location information must be mapped back to a callback number with geographic significance in order to reach the emergency call center via the so-called PSTN network, which is usually associated with significant effort.

Often different location-based services also require that location information be supplied in different data formats. For example, a location-specific telephone number is required for emergency calls, while other services require the GPS coordinates of the device, for example. Other services, such as e-mail, require information about the location of the device from which the e-mail has been sent in text form, in order for such information to be sent in an e-mail, in the format City, Street, House Number, for example. There are also location-based services that require the location information in a processed manner, e.g., in the form of pixel or vector graphics.

It is generally desirable that no additional administrative activities become necessary during network operation. A trouble-free network operating largely without additional interventions should be ensured without users or administrators having to make changes or interventions when using location-based services.

In some embodiments of the invention, the subscriber unit, for example, a telephone terminal unit or a telephone application on a notebook, obtains location-based information, such as the location identifier (LID), from the network infrastructure. Preferably, this location identifier is independent of an IP address assigned to the subscriber unit or of a so-called FQDN. Preferably, this location identifier is allocated to a specific switch port or preferably to an entire floor of a building or even to the entire building.

The location identifier is an internal variable which identifies the location of the subscriber unit and is preferably adapted by the location mapping service to a format required by the addressed service. As described below, the location identifier can be adapted to a callback number (the location identification number, LIN). Preferably, this callback number (location identification number, LIN) is used in case of an emergency call. From a database that is preferably located at the emergency call center, data on the caller, preferably the home address and/or the caller's callback number, can be determined with the location identifier number (LIN). In an emergency call, the location identifier number (LIN) is transmitted as the calling number and is preferably registered in a database at the emergency call center. In some embodiments of the invention, when a device logs into the network, for example, this device receives the location identification via protocols such as DHCP, LLDP-MED or other protocols and stores it internally in the subscriber unit. Preferably, the location identifier uniquely represents a specific location. The location identifier may be assigned in a different manner for each switch port, which is associated with the best possible accuracy (location resolution).

In other embodiments of the invention, some or all of the LAN ports of a building floor or even of an entire building may receive the same location identifier. Assigning the same location identifier to different switch ports is a matter of the required accuracy and location resolution for the corresponding location-based services.

In some embodiments of the invention, with requests to location-based services, for example in the form of SIP requests or in the form of other protocols, using the SOAP for example, the location identifier is sent along in a transparent form with the message sent to the location-based service. The recipient of the so-called request, i.e., the SIP server for example, will then convert, preferably using a respective service (location mapping service), the location identifier into location-based information in a format required by that service.

Such a location mapping service allows, for example, respective location information to be generated in any desired format for a variety of location-based services. For emergency calls, this location identifier is preferably converted into a location identification number (LIN) as an emergency callback number and used from then on. For other location-based services, the location identifier can be mapped or translated into respective location information.

For example, the location service can provide GPS coordinates for the device location in order to display it on a map or street guide. In other exemplary embodiments of the invention, the location service can provide the address for the same site, preferably in the form of City, Street, House number, Floor, Room, etc. In other exemplary embodiments of the invention, the location mapping service can provide a short version of the location for sending an electronic business card. In other exemplary embodiments of the invention, the location mapping service can provide respective bitmaps or vector graphics with the required graphic information and send them together with the message. Preferably, only the generic location identifier will be needed as an input variable.

The location mapping service that is required for converting the address formats and that converts the location identifier, preferably conforming to the actual layout of the site and the premises, into either into a real location or a usable emergency callback number is a network function that is preferably provided by a network component. The subscriber unit's location obtained using the location mapping service can also be used for other location-dependent services.

Due to the fact that, according to some embodiments of the invention, the location identifier is loaded automatically from the network infrastructure, i.e., from a network component, this embodiment of the invention allows for automatic support of so-called nomadic devices put into operation somewhere within a corporate network.

In some embodiments of the invention, the location identifier is formed from the information elements (digits) of GPS coordinates (latitude, longitude, altitude). In this form, a location identifier will also be readable by information technology equipment (machine readable). It can thus also be interpreted, for example in the emergency call center, in case of a failure of the location mapping service.

Location-based services such as emergency calls often require considerable administrative effort to integrate the location information from subscriber units such as telephones into the network infrastructure. This applies regardless of whether the location information is obtained and administered from the network infrastructure, via a pre-configuration of network components or via other services.

Configuration errors can never be ruled out completely. LAN wiring in office buildings and entire office complexes can require many miles of LAN cables, various hierarchies of LAN switches and routers. Often they suffer from a juxtaposition of existing (older) LAN wiring and new LAN cables that are added to the existing wiring. In this context, reliable processes, methods and equipment are needed to ensure the correctness of location-based information. Correctness in this case means to ensure that a subscriber unit is actually located at the location for which its entry in the network infrastructure is configured.

Some exemplary embodiments of the invention now allow examination of the correctness of location information by the subscriber who typically uses a subscriber unit. In the case of a telephone terminal unit, a telephone application is preferably provided in this context that communicates with the user using a telephone display or a voice menu. In the case of an application on a notebook, the location information determined by the network can be communicated to the user or subscriber preferably via a so-called pop-up dialog or the like.

Preferably after registering the subscriber unit in the network, i.e., as a rule after start-up of the telephone unit, notebook or other subscriber unit, the user or subscriber is shown the configured or determined location information via a display device on the telephone or in text form via a telephone menu using a protocol, for example the session initiation protocol SIP or the SOAP, or also using other protocols. In other exemplary embodiments of the invention, this information can also be read to the user or subscriber via a speech synthesizer (text-to-speech).

The user or subscriber then has the opportunity to review the displayed or output location information and to confirm the correctness of the information by pressing a particular key. For example, in this context, pressing the '1' key could indicate confirmation of the correctness of the information. Another key could indicate that the information is not correct and that the network administrator must correct this particular entry. This could be done, e.g., by pressing the '2' key, which indicates to the network administrator that he must check the location information for this port. Pressing another key, e.g., the '3' key, could mean in this context that the display or announcement must be repeated.

If the user presses the '2' key, i.e., the key indicating that the location information displayed to him is incorrect, this could trigger an action that temporarily turns off or locks the respective location-based services for that device until the correct location information is entered into (provided to) the network infrastructure or relevant network component. For example, an e-mail could be sent to the system administrator, who then has to attend to this particular entry in the system.

Preferably, the consistency of location information is verified by the subscriber only once, namely after it has been provided to this subscriber unit's LAN port. After that, verification is no longer required on a regular basis, i.e., a user or subscriber does not need to perform this review procedure every time, because the location information is preferably linked to the LAN port in a fixed manner. The same is true when another device, such as a telephone, is connected subsequently to this port. In this case, the location mapping system sets a respective information unit, such as a "correct flag," when confirming the correctness of the location information to prevent re-querying of the subscriber.

In some preferred exemplary embodiments of the invention, the network infrastructure is capable of recognizing a change in the network infrastructure, using devices or network elements intended for this purpose. This can be done, for example, by a modified MAC address or by several modified MAC addresses within the system; then a re-verification of the location information can be initiated by the subscriber.

In the event that the location information is present as GPS coordinates, and is therefore not readily verifiable for a subscriber, preferably the subscriber can be provided with an application that presents the GPS coordinates on a city map or other type of map. This will allow the subscriber to see displayed and verify even location information that is originally not available to him for verification.

Using these exemplary embodiments of the invention, it is possible to detect and fix configuration errors easily when configuring location information in network components.

FIG. 1 schematically shows an exemplary embodiment of the invention in which a subscriber unit TG obtains location information 11 from a network component NK and incorporates this location information into a message 12, which in this example is initially sent to a router R, which forwards the message 13, 14 via a wide area network (WAN) to the provider LDS of a location-based service. Since the service provider of the location-based service LDS has received the subscriber unit's location information in the messages 12, 13 and 14 and it is now known to him, he can reply in a location-based manner to the request from the subscriber unit and sends a respective message 15 via the wide area network, which forwards 17 it 16 via the router R to the subscriber unit TG.

FIG. 2 schematically shows another exemplary embodiment of the invention, in which the subscriber unit TG sends a message 21 to the router R, wherein this message 21 does not include location-based information about the subscriber unit. The router R determines that it is a message to a location-based service LDS and that the message does not include location-based information about the subscriber unit TG. As a result, the router R sends a request 22 to the network component NK where the location-based information about the subscriber unit TG is stored.

The network component NK replies to this request from the router R with a message 23 to the router R that includes the location-based information about the subscriber unit TG. The router R can then insert the location-based information about the subscriber unit TG into the message 21 sent to the router R by the subscriber unit TG and in this manner generate a message 24, which the router forwards 24 to the wide area network, and which is forwarded 25 via the wide area network to the provider of the location-based service LDS.

The location-based service, now in possession of the location-based information about the subscriber unit TG, can now answer the request 21 from the subscriber unit TG in a reasonable manner, i.e., using the location-based information for the subscriber unit TG, and to this end sends 26 a message to the wide area network, which forwards 28 this message 27 in router R to the subscriber unit TG.

FIG. 3 schematically shows another exemplary embodiment of the invention, where a subscriber unit TG obtains a location identifier (LID) from a network authority LP, in which location-based information about subscribers units on the network is stored. In the event that the subscriber unit now intends to send a request 32 to a location-based service LDS, the message initially goes through a session border control SBC, which replaces the internal IP address of the subscriber unit with an external IP address.

Because the message 32 in this example still contains a generic location identifier that cannot or should not be used for external callbacks, in the message 32 the session border control (SBC) also replaces the generic location identifier that is to be used only internally, for example, with a location identifier that is also externally valid, for example a call number that can be used externally, wherein the session border control (SBC) initially directs 33 a respective request to a database DB, which this database DB answers 34 by transferring 34 the externally valid location identifier to the session border control (SBC). This externally valid location identifier is preferably inserted in a format that is specific to the addressed location-based service.

The message 32 provided with the externally valid location identifier is then 35 forwarded 35, 36 via a wide area network WAN to the location-based service LDS. The location-based service, for example an emergency call number, now initiates a callback 37, 38, 39 using the external callback number provided to it.

We claim:

1. A method by which location information associated with a subscriber unit is communicated to a service that requires location information of the subscriber unit, the method comprising:
the subscriber unit transmitting a message;
a first network component connected to the subscriber unit receiving the message;
the first network component analyzing the received message to determine whether the message is addressed to the service;
upon determining that the message is addressed to the service, the first network component determining location information identifying a geographical location of the subscriber unit;
the first network component inserting the location information into the message;
the first network component transmitting the message having the inserted location information to the service;
presenting by displaying or announcing, by the subscriber unit information identifying the geographical location of the subscriber unit, the information identifying the geographical location comprising at least one of a room number, a building number, geographical related coordinates, a name of a city in which the geographical location is within, and a name of a street on which the geographical location is on;
after display or announcement of the information identifying the geographical location of the subscriber unit, providing a subscriber associated with the subscriber unit the option to perform at least one member of the group consisting of:
a) confirming the accuracy of the information identifying the geographical location,
b) repeating its display or announcement, and
c) identifying the information identifying the geographical location as inaccurate through a respective input at the subscriber unit.

2. The method of claim 1 further comprising: the first network component storing at least one piece of information about a geographical location of the subscriber unit from a network admission control in response to receiving the message from the subscriber unit and wherein the first network component is a router.

3. The method of claim 1 wherein the subscriber unit is a telephone, a notebook, an internet phone, a desktop computer, or a communication terminal unit and wherein the first network component is a router and wherein the first network component determines the location information via communications with a network access control switch.

4. The method of claim 1 wherein the location information determined by the first network component is different from a network address of the subscriber unit and is independent of the network address of the subscriber unit.

5. The method of claim 1 wherein the location information is identical for multiple subscriber units that are spatially adjacent to each other.

6. The method of claim 1 wherein the location information is in a format adapted to the service.

7. The method of claim 1 further comprising:
locking the subscriber unit from the service after receipt of the input at the subscriber unit identifies the information identifying the geographical location as inaccurate.

8. The method of claim 7 wherein the presenting by displaying or announcing occurs after the first network component registers a change of network structure.

9. The method of claim 7 wherein the subscriber unit is locked such that the service is unavailable to the subscriber unit until the first network component receives correct location information identifying a correct geographical location of the subscriber unit.

10. The method of claim 1 further comprising:
upon a determination that the message is not directed to a service that requires location information, removing the location information inserted within the message prior to the message being sent to the service.

11. The method of claim 1 further comprising:
a network access control switch assigning the location information to the subscriber unit.

12. The method of claim 1 wherein a location mapping service converts the location information into a location identifier having a format acceptable to the service.

13. The method of claim 1 further comprising:
the subscriber unit registering in a network of the first network component.

14. A method for a subscriber unit's communication with a service that requires the subscriber unit's location information, comprising:
sending the service a message from the subscriber unit, said message containing information about the subscriber unit's location;
storing at least one piece of information about the subscriber unit's location in at least one network component;
making the at least one piece of information available by a network component;
presenting by displaying or announcing, by the subscriber unit at least one piece of information about the subscriber unit's location stored in the network component;
after display or announcement of the at least one piece of information about the subscriber unit's location stored in the network component, providing a subscriber the option to perform at least one member of the group consisting of:
a) confirming accuracy of the information,
b) repeating its display or announcement, and
c) identifying the information as inaccurate; and
locking a subscriber unit with respect to at least one service that requires information about the subscriber unit's location, if after a display or announcement of the at least one piece of information about the subscriber unit's location stored in a component of the network, a subscriber has marked this information as incorrect through a respective input at the subscriber unit.

15. The method of claim 14 wherein the presenting, by displaying or announcing of the at least one piece of information about the subscriber unit's location stored in a network component occurs after the network component has registered a change of network structure.

* * * * *